(12) United States Patent
Liang et al.

(10) Patent No.: US 11,540,216 B2
(45) Date of Patent: Dec. 27, 2022

(54) INTERACTIVE ELECTRONIC TAG DEVICE COMMUNICATION SYSTEM AND METHOD

(71) Applicant: Hanshow Technology Co., Ltd., Zhejiang (CN)

(72) Inventors: Min Liang, Zhejiang (CN); Shiguo Hou, Zhejiang (CN); Jun Chen, Zhejiang (CN); Qi Jiang, Zhejiang (CN); Yang Zhao, Zhejiang (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 17/257,570

(22) PCT Filed: Jan. 4, 2019

(86) PCT No.: PCT/CN2019/070431
§ 371 (c)(1),
(2) Date: Jan. 2, 2021

(87) PCT Pub. No.: WO2020/007022
PCT Pub. Date: Jan. 9, 2020

(65) Prior Publication Data
US 2021/0321332 A1     Oct. 14, 2021

(30) Foreign Application Priority Data
Jul. 2, 2018 (CN) .......................... 201810706496.2

(51) Int. Cl.
*H04W 52/02* (2009.01)
*H04W 76/15* (2018.01)

(52) U.S. Cl.
CPC ... *H04W 52/0229* (2013.01); *H04W 52/0212* (2013.01); *H04W 52/0235* (2013.01); *H04W 76/15* (2018.02)

(58) Field of Classification Search
CPC ..... H04W 76/28; H04W 76/15; H04W 76/20; H04W 4/70–80
See application file for complete search history.

(56) References Cited

U.S. PATENT DOCUMENTS

2009/0102655 A1 * 4/2009 Yi .......................... H04W 12/02
340/572.1
2012/0326846 A1   12/2012 Tseng et al.
(Continued)

FOREIGN PATENT DOCUMENTS

| CN | 103093170   | 5/2013 |
| CN | 103105625 A | 5/2013 |

(Continued)

OTHER PUBLICATIONS

International search report issued for counterpart Chinese patent application No. PCT/CN2019/070431 dated Mar. 22, 2019.
(Continued)

*Primary Examiner* — San Htun
(74) *Attorney, Agent, or Firm* — NZ Carr Law Office PLLC

(57) ABSTRACT

This disclosure provides an interactive electronic tag device communication system and method, including: a background server, a base station, an electronic tag device and an external device; the external device transmits first data to an electronic tag device through a second communication path; the electronic tag device receives the first data and transmits the same to a base station through a first communication path, and enters a fast monitoring mode; the base station receives the first data and transmits the same to background server; the background server generates a control instruction and second data, and transmits the same to the base station; the base station receives a fast wake-up instruction, the control instruction and the second data and transmits the same to electronic tag device through first communication (Continued)

path; the electronic tag device receives fast wake-up instruction, control instruction and second data, and switches to the normal monitoring mode after completing communication.

19 Claims, 3 Drawing Sheets

(56) References Cited

U.S. PATENT DOCUMENTS

| | | | |
|---|---|---|---|
| 2014/0006827 A1* | 1/2014 | Seto | G06F 1/3284 |
| | | | 713/323 |
| 2014/0266625 A1 | 9/2014 | Merlin et al. | |
| 2015/0002274 A1* | 1/2015 | Sengstaken, Jr. | G06K 7/10009 |
| | | | 340/10.34 |
| 2016/0197736 A1* | 7/2016 | Shvarzberg | H04L 12/12 |
| | | | 713/310 |
| 2016/0350564 A1* | 12/2016 | Nedelcu | G16H 40/67 |
| 2018/0174009 A1 | 6/2018 | Schleef et al. | |

FOREIGN PATENT DOCUMENTS

| | | | |
|---|---|---|---|
| CN | 104219741 A | 12/2014 | |
| CN | 107343259 A | 11/2017 | |
| CN | 110677898 A | 1/2020 | |
| EP | 2835772 | 2/2015 | |

OTHER PUBLICATIONS

The First Office Action and search report dated Feb. 24, 2021 for counterpart Chinese patent application No. 201810706496.2, along with machine EN translation downloaded from EPO.
Extended European Search Report dated Mar. 1, 2022 for counterpart European patent application No. 19830815.7.

* cited by examiner

INTERACTIVE ELECTRONIC TAG DEVICE COMMUNICATION SYSTEM AND METHOD

CROSS-REFERENCE TO RELATED APPLICATIONS

This application is a National Stage Application of International Application No. PCT/CN2019/070431, filed on Jan. 4, 2019, which claims priority to Chinese Patent Application No. 201810706496.2, filed on Jul. 2, 2018, and entitled "Interactive Electronic tag device Communication System and Method", the entire contents of which are incorporated herein by reference.

TECHNICAL FIELD

The present disclosure relates to the technical field of data communication, and in particular to an interactive electronic tag device communication system and method.

BACKGROUND

Based on a wireless communication protocol of an electronic price tag on 2.4 GHz, a conventional practice is that a radio frequency module of the electronic tag device automatically wakes up every other time period (hereinafter referred to as a "monitoring period" of the electronic tag device, such as 30 s) to monitor whether there is a communication request. If there is a communication request, the electronic tag device enters a data transmission mode for data reception, then executes or stores the received instructions and data. If a base station device which communicates with the radio frequency module intends to communicate with a certain electronic tag device, the electronic tag device needs to be waked up at first for a period (hereinafter referred to as a "wake-up duration" of the base station device, such as 35 s) longer than the monitoring period of the electronic tag device, and then instructions and data can be transmitted. In this case, it requires at least a duration longer than the "wake-up duration" to transmit an instruction to an electronic tag device, so as to complete the communication with the electronic tag device. Due to limits of the electronic tag device in terms of volume, weight, cost and the like in practical applications, the battery and capacity of the electronic tag device are limited, and frequent monitoring of the electronic tag device will cause an increase of power consumption. In order to take into account communication speed and battery life, a longer monitoring period (such as 20 s) is usually adopted to reduce the power consumption, so as to improve the battery life.

In actual usage scenarios, for example, when the operator operates in front of the electronic tag device (transmitting an instruction to the electronic tag device, changing data, etc.), it is hoped that the electronic tag device can provide immediate feedback (usually within 3 s). In order to improve the response speed of the electronic tag device, it is required to shorten the monitoring period (for example, 1 s). In a usage scenario of a large-scale electronic tag device, since it is uncertain which electronic tag devices need to interact, the monitoring periods of all electronic tag devices have to be shortened to meet customer experience requirements. In this way, the power consumption of monitoring the wake-up signal in the electronic tag device will increase significantly. For example, the original monitoring period is 20 s, while the existing monitoring period is 1 s. Under the existing monitoring period, the battery power consumption is 20 times of the original power consumption, and this situation will have a great impact on the battery life. For the usage scenarios of the large-scale electronic tag device, it will cause more frequent replacements and increase labor costs.

SUMMARY

Embodiments of the present disclosure provide an interactive electronic tag device communication system and a method thereof. It only needs to set a normal monitoring mode and a fast monitoring mode in an electronic tag device, and set a normal wake-up mode and a fast wake-up mode in a base station, then the customer experience requirements can be met without shortening the monitoring periods of all electronic tag devices, without increasing battery power consumption, and without increasing labor costs.

The interactive electronic tag device communication system comprises: a background server, a base station, an electronic tag device and an external device;
wherein the electronic tag device comprises two communication paths: a first communication path and a second communication path; the first communication path supports two monitoring modes: a normal monitoring mode and a fast monitoring mode; and the base station comprises two wake-up modes: a normal wake-up mode and a fast wake-up mode;
the external device is configured to transmit first data to the electronic tag device through the second communication path;
the electronic tag device is configured to receive the first data, transmit the first data to the base station through the first communication path, and enter the fast monitoring mode; the base station is configured to receive the first data and transmit the first data to the background server;
the background server is configured to generate a control instruction and second data according to the first data, and transmit the control instruction and the second data to the base station; the base station is further configured to receive the control instruction and the second data, communicate with the electronic tag device in the fast wake-up mode, and transmit a fast wake-up instruction, the control instruction and the second data to the electronic tag device through the first communication path;
the electronic tag device is further configured to receive the fast wake-up instruction, the control instruction and the second data, and switch to the normal monitoring mode after completing the communication.

The interactive electronic tag device communication method comprises: transmitting, by an external device, first data to an electronic tag device through a second communication path in the electronic tag device;
receiving, by the electronic tag device, the first data, transmitting the first data to a base station through a first communication path in the electronic tag device, and entering a fast monitoring mode;
receiving, by the base station, the first data and transmitting the first data to a background server; generating, by the background server, a control instruction and second data according to the first data, and transmitting the control instruction and the second data to the base station;
receiving, by the base station, the control instruction and the second data, communicating with the electronic tag device in a fast wake-up mode, and transmitting a fast wake-up instruction, the control instruction and the second data to the electronic tag device through the first communication path; and receiving, by the electronic tag device, the fast wake-up instruction, the control instruction and the second data, and switching to a normal monitoring mode after completing the communication;

wherein the electronic tag device comprises two communication paths: the first communication path and the second communication path, the first communication path supports two monitoring modes: the normal monitoring mode and the fast monitoring mode, and the base station comprises two wake-up modes: a normal wake-up mode and the fast wake-up mode.

The embodiment of the present disclosure further provides a computer device comprising a memory, a processor and a computer program stored on the memory and executable by the processor, the processor implements, when executing the computer program, the interactive electronic tag device communication method as described above.

The embodiment of the present disclosure further provides a computer readable storage medium storing therein a computer program for executing the interactive electronic tag device communication method as described above.

In the embodiments of the present disclosure, it only needs to set a normal monitoring mode and a fast monitoring mode in the electronic tag device, and set a normal wake-up mode and a fast wake-up mode in the base station, then the customer experience requirements can be met without shortening the monitoring periods of all electronic tag devices, without increasing battery power consumption, and without increasing labor costs.

BRIEF DESCRIPTION OF DRAWINGS

In order to more clearly explain the embodiments of the invention or the technical solution in the prior art, drawings that need to be used in the description in embodiments or the prior art will be simply introduced below, obviously the drawings in the following description are merely some examples of the invention, for persons ordinarily skilled in the art, it is also possible to obtain other drawings according to these drawings without making creative efforts.

DESCRIPTION OF EMBODIMENTS

Hereinafter the technical solution in the embodiments of the present disclosure will be described clearly and integrally in combination with the accompanying drawings in the embodiments of the present disclosure, and obviously the described embodiments are merely part of the embodiments, rather than all of the embodiments. Based on the embodiments of the present disclosure, all other embodiments obtained by persons skilled in the art without making creative efforts fall within the protection scope of the present disclosure.

Figure 1:
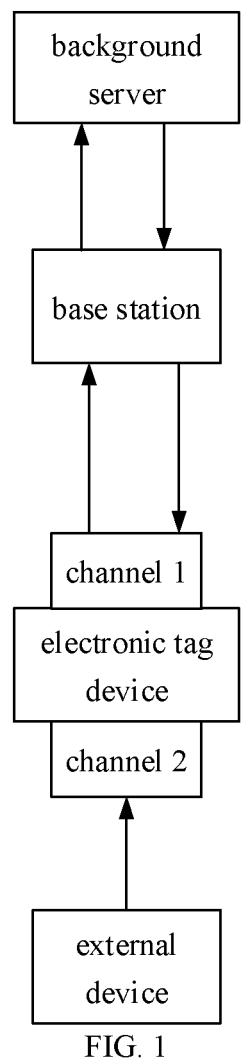
FIG. 1 is a structural diagram of an interactive electronic tag device communication system provided in an embodiment of the present disclosure.

In an embodiment of the present disclosure, there is provided an interactive electronic tag device communication system and method. As shown in FIG. 1, the interactive electronic tag device communication system comprises: a background server, a base station, an electronic tag device and an external device; wherein the electronic tag device comprises two communication paths: a first communication path and a second communication path. The first communication path supports two monitoring modes: a normal monitoring mode and a fast monitoring mode. The base station comprises two wake-up modes: a normal wake-up mode and a fast wake-up mode.

The external device is configured to transmit first data to the electronic tag device through the second communication path.

The electronic tag device is configured to receive the first data, transmit the first data to the base station through the first communication path, and enter the fast monitoring mode.

The base station is configured to receive the first data and transmitting the first data to the background server.

The background server is configured to generate a control instruction and second data according to the first data, and transmit the control instruction and the second data to the base station.

The base station is further configured to receive the control instruction and the second data, communicate with the electronic tag device in the fast wake-up mode, and transmit a fast wake-up instruction, the control instruction and the second data to the electronic tag device through the first communication path.

The electronic tag device is further configured to receive the fast wake-up instruction, the control instruction and the second data, and switch to the normal monitoring mode after completing the communication.

In the embodiment of the present disclosure, the electronic tag device has two communication paths. The first communication path (channel 1) is a 2.4 G RF (Radio Frequency) path. The electronic tag device performs data interaction with the base station and the background server through the first communication path which is used for the background server and the base station to transmit a control instruction and data to the electronic tag device, where the control instruction and data include screen update, data update, device control, status change, and device status information query and the like. The second communication path (channel 2) is other wireless communication modules, such as a magnetic switch, an NFC switch, an infrared switch, etc. The electronic tag device performs a data interaction with external devices through the second communication path which is used for the external device to transmit data (including screen update, data update, device control, status change, etc.) to the electronic tag device and receive data (such as device status information query, read public area data, read private area data, etc.).

By default, the electronic tag device performs monitoring in a normal monitoring mode supported by the first communication path. The base station communicates with the electronic tag device in a normal wake-up mode.

In the embodiment of the present disclosure, the electronic tag device has a unique tag ID. Therefore, when transmitting the first data to the base station, the electronic tag device also attaches the ID of the electronic tag device to the first data, and transmits the first data with the ID attached to the base station.

In the embodiment of the present disclosure, the data transmitted by the external device to the electronic tag device through the second communication path may be forwarded by the electronic tag device through the first communication path to achieve the interaction. During the actual data forwarding, the first data may be received by a plurality of base stations. At this time, when the plurality of base stations transmit the first data to the background server, respective energy value information of the plurality of base stations is attached to the first data. The background server will parse and de-duplicate the first data uploaded by the plurality of base stations, then determine an optimal base station among the plurality of base stations according to the respective energy value information of the plurality of base stations, and transmit the control instruction and the second data to the electronic tag device through the optimal base station.

In the embodiment of the present disclosure, the electronic tag device cannot be in the fast wake-up mode all the time. When the fast wake-up instruction transmitted by the base station is not received within a preset time range, the electronic tag device will switch to the normal monitoring mode. Alternatively, when the fast wake-up instruction is received, but the control instruction and the second data are not received within the preset time range, the electronic tag device will switch to the normal monitoring mode.

Based on the same inventive concept, the embodiment of the present disclosure further provides an interactive electronic tag device communication method, as described in the following embodiment. Since the principle of the interactive electronic tag device communication method to solve the problem is similar to that of the interactive electronic tag device communication system, implementation of the interactive electronic tag device communication method can refer to the implementation of the interactive electronic tag device communication apparatus, and the repetition will not be repeated.

Figure 2:
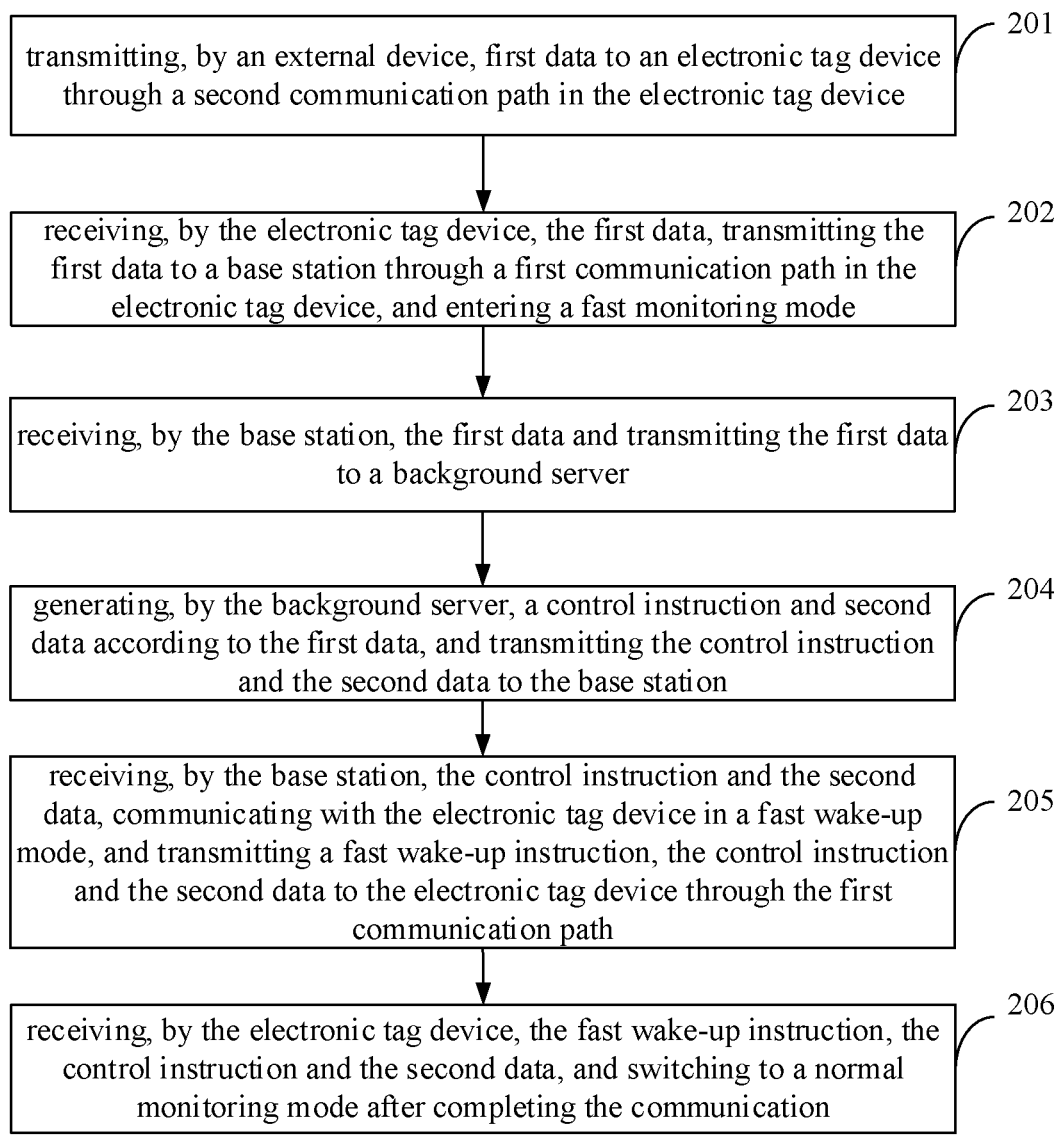
FIG. 2 is a flow chart of an interactive electronic tag device communication method provided in an embodiment of the invention.

FIG. 2 is a flow chart of an interactive electronic tag device communication method according to the embodiment of the disclosure. As shown in FIG. 2, the method comprises:

a step 201 of transmitting, by an external device, first data to an electronic tag device through a second communication path in the electronic tag device;

a step 202 of receiving, by the electronic tag device, the first data, transmitting the first data to a base station through a first communication path in the electronic tag device, and entering a fast monitoring mode;

a step 203 of receiving, by the base station, the first data and transmitting the first data to a background server;

a step 204 of generating, by the background server, a control instruction and second data according to the first data, and transmitting the control instruction and the second data to the base station;

a step 205 of receiving, by the base station, the control instruction and the second data, communicating with the electronic tag device in a fast wake-up mode, and transmitting a fast wake-up instruction, the control instruction and the second data to the electronic tag device through the first communication path;

a step 206 of receiving, by the electronic tag device, the fast wake-up instruction, the control instruction and the second data, and switching to a normal monitoring mode after completing the communication;

wherein the electronic tag device comprises two communication paths: the first communication path and the second communication path, the first communication path supports two monitoring modes: the normal monitoring mode and the fast monitoring mode, and the base station comprises two wake-up modes: a normal wake-up mode and the fast wake-up mode.

Figure 3:
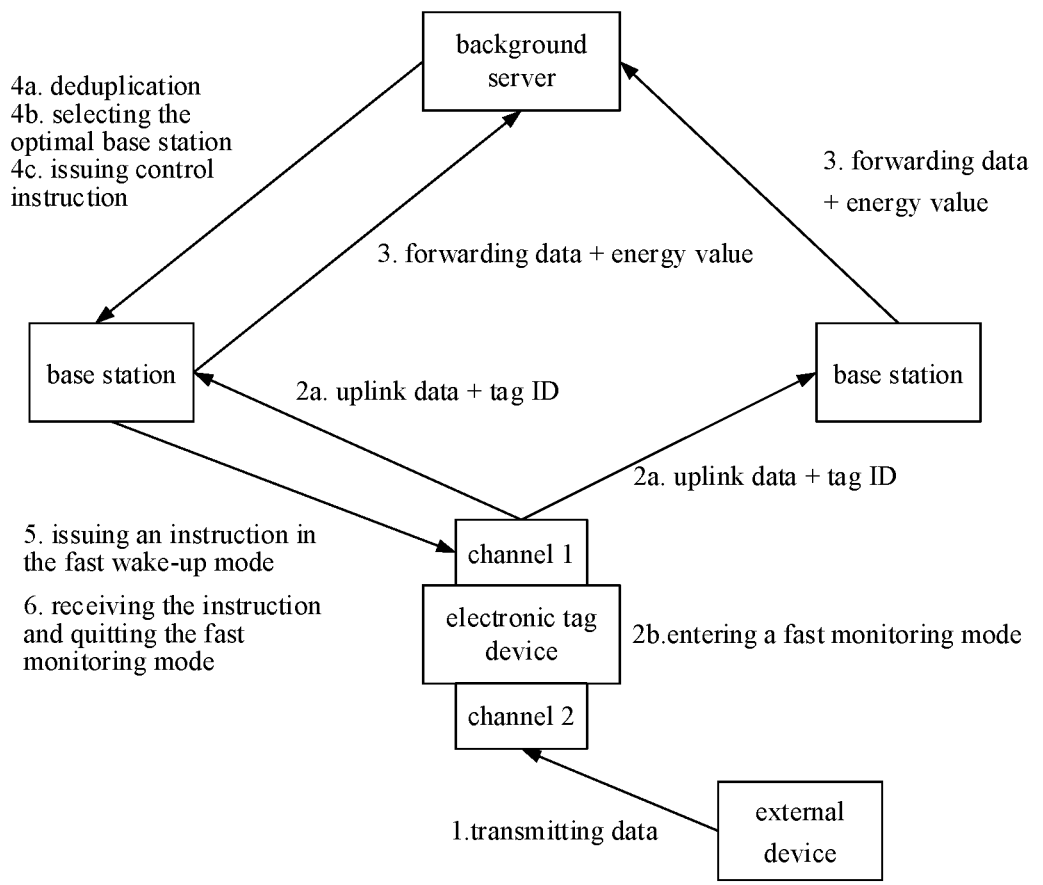
FIG. 3 is a diagram of structure and data interaction of an interactive electronic tag device communication system provided in an embodiment of the present disclosure.

In the embodiment of the present disclosure, only a method flow in which one base station receives the first data transmitted by the electronic tag device is mentioned in the above method. In the actual data transmission, the first data may be received by a plurality of base stations. The process of this method is shown in FIG. 3:

1. The external device transmits the first data to the electronic tag device through channel 1.
2a. The electronic tag device transmits uplink data (first data) and a tag ID to a plurality of base stations.
2b. The electronic tag device enters the fast monitoring mode.
3. The plurality of base stations forward the first data and their respective energy values to the background server.
4a. The background server performs the deduplication processing on the received a plurality of first data.
4b. The background server selects an optimal base station from the plurality of base stations according to the respective energy values of the plurality of base stations.
4c. The background server selects the optimal base station to issue corresponding control instruction and second data.
5. After the selected optimal base station receives the control instruction and the second data, the selected optimal base station communicates with the electronic tag device in a fast wake-up mode and issues the instruction.
6. The electronic tag device receives the control command and the second data through the channel 2, completes fast communication, and returns to the normal monitoring mode.

The embodiment of the present disclosure further provides a computer device comprising a memory, a processor and a computer program stored on the memory and executable by the processor, the processor implements, when executing the computer program, the interactive electronic tag device communication method as described above.

The embodiment of the present disclosure further provides a computer readable storage medium storing therein a computer program for executing the interactive electronic tag device communication method as described above.

In summary, in the present disclosure, it only needs to set a normal monitoring mode and a fast monitoring mode in the electronic tag device, and set a normal wake-up mode and a fast wake-up mode in the base station, then the customer experience requirements can be met without shortening the monitoring period of all electronic tag devices, without increasing battery power consumption, and without increasing labor costs.

The present disclosure mainly realizes the fast electronic tag communication (within 3 s) under a large-scale electronic tag usage scenario (electronic tags of 20,000 and above), while not having a significant impact on the battery life.

Persons skilled in the art shall understand that, the embodiments of the present disclosure can be provided as a method, a system or a computer program product. Therefore, the present disclosure can adopt the forms of a full hardware example, a full software example, or a combination of a software example and a hardware example. Moreover, the present disclosure can adopt the form of a computer program product that is implemented on one or more computer-usable storage medium (including but not limited to a disk memory, a CD-ROM, an optical memory, and etc.) including computer-usable program codes.

The disclosure is described with reference to flow diagrams and/or block diagrams of the method, the device (system) and the computer program product according to the embodiment of the disclosure. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program instructions can also be stored in a computer-readable memory that can guide a computer or other programmable data processing device to operate in a special way, so that the instruction stored in the computer-readable memory generates a manufactured product including an instruction device which achieves functions designated in one or more flows in the flow diagrams and/or one or more blocks in the block diagrams.

These computer program instructions can also be loaded on a computer or other programmable data processing device, on which a series of operation steps are executed to generate processing achieved by the computer, so that the instruction executed on the computer or other programmable data processing device is provided for being used in the steps of achieving functions designated in one or more flows in the flow diagrams and/or one or more blocks in the block diagrams.

The foregoing is merely a preferred embodiment of the present disclosure and is not intended to limit the present disclosure, and various modifications and variations can be made to the embodiment of the present disclosure by those skilled in the art. Any modifications, equivalents, improvements, etc. made within the spirit and principle of the present disclosure are intended to be included within the protection scope of the present disclosure.

What is claimed is:

1. An interactive electronic tag device communication system, comprising: a background server, a base station, an electronic tag device and an external device;
    wherein the electronic tag device comprises two communication paths: a first communication path and a second communication path; the first communication path supports two monitoring modes: a normal monitoring mode and a fast monitoring mode; and the base station comprises two wake-up modes: a normal wake-up mode and a fast wake-up mode;
    the external device is configured to transmit first data to the electronic tag device through the second communication path;
    the electronic tag device is configured to receive the first data, transmit the first data to the base station through the first communication path, and enter the fast monitoring mode;
    the base station is configured to receive the first data and transmit the first data to the background server;
    the background server is configured to generate a control instruction and second data according to the first data, and transmit the control instruction and the second data to the base station;
    the base station is further configured to receive the control instruction and the second data, communicate with the electronic tag device in the fast wake-up mode, and transmit a fast wake-up instruction, the control instruction and the second data to the electronic tag device through the first communication path; and
    the electronic tag device is further configured to receive the fast wake-up instruction, the control instruction and the second data, and switch to the normal monitoring mode after completing the communication.

2. The interactive electronic tag device communication system according to claim 1, wherein the electronic tag device is configured to attach an ID of the electronic tag device to the first data when transmitting the first data to the base station.

3. The interactive electronic tag device communication system according to claim 1, wherein when the first data is received by a plurality of base stations, the plurality of base stations are configured to attach respective energy value information of the plurality of base stations to the first data when transmitting the first data to the background server;
    the background server is configured to determine an optimal base station among the plurality of base stations according to the respective energy value information of the plurality of base stations, and transmit the control instruction and the second data to the electronic tag device through the optimal base station.

4. The interactive electronic tag device communication system according to claim 3, wherein the background server is further configured to perform deduplication processing on the first data uploaded by the plurality of base stations.

5. The interactive electronic tag device communication system according to claim 1, wherein the electronic tag device is further configured to switch to the normal monitoring mode when the fast wake-up instruction transmitted by the base station is not received within a preset time range.

6. The interactive electronic tag device communication system according to claim 1, wherein the electronic tag device is further configured to switch to the normal monitoring mode when the fast wake-up instruction is received but the control instruction and the second data are not received within a preset time range.

7. An interactive electronic tag device communication method, comprising:
    transmitting, by an external device, first data to an electronic tag device through a second communication path in the electronic tag device;
    receiving, by the electronic tag device, the first data, transmitting the first data to a base station through a first communication path in the electronic tag device, and entering a fast monitoring mode;
    receiving, by the base station, the first data and transmitting the first data to a background server;
    generating, by the background server, a control instruction and second data according to the first data, and transmitting the control instruction and the second data to the base station;
    receiving, by the base station, the control instruction and the second data, communicating with the electronic tag device in a fast wake-up mode, and transmitting a fast wake-up instruction, the control instruction and the second data to the electronic tag device through the first communication path; and
    receiving, by the electronic tag device, the fast wake-up instruction, the control instruction and the second data, and switching to a normal monitoring mode after completing the communication;
    wherein the electronic tag device comprises two communication paths: the first communication path and the second communication path, the first communication path supports two monitoring modes: the normal monitoring mode and the fast monitoring mode, and the base station comprises two wake-up modes: a normal wake-up mode and the fast wake-up mode.

8. The interactive electronic tag device communication method according to claim 7, wherein transmitting, by the electronic tag device, the first data to the base station comprises:
attaching an ID of the electronic tag device to the first data, and transmitting the ID of the electronic tag device and the first data to the base station.

9. The interactive electronic tag device communication method according to claim 7, wherein receiving, by the base station, the first data and transmitting the first data to a background server comprises:
attaching, by a plurality of base stations, respective energy value information of the plurality of base stations to the first data when receiving the first data, and transmitting, by the plurality of base stations, the first data and the respective energy value information of the plurality of base stations to the background server.

10. The interactive electronic tag device communication method according to claim 9, further comprising: performing, by the background server, deduplication processing on the first data uploaded by the plurality of base stations.

11. The interactive electronic tag device communication method according to claim 7, further comprising: switching, by the electronic tag device, to a normal monitoring mode when the fast wake-up instruction transmitted by the base station is not received within a preset time range.

12. The interactive electronic tag device communication method according to claim 7, further comprising: switching, by the electronic tag device, to the normal monitoring mode when the fast wake-up instruction is received but the control instruction and the second data are not received within a preset time range.

13. A computer device comprising a memory, a processor and a computer program stored on the memory and executable by the processor, wherein the processor implements, when executing the computer program, the method according to claim 7.

14. A non-transitory computer-readable storage medium storing therein a computer program for executing an interactive electronic tag device communication method comprising:
transmitting, by an external device, first data to an electronic tag device through a second communication path in the electronic tag device;
receiving, by the electronic tag device, the first data, transmitting the first data to a base station through a first communication path in the electronic tag device, and entering a fast monitoring mode;
receiving, by the base station, the first data and transmitting the first data to a background server;
generating, by the background server, a control instruction and second data according to the first data, and transmitting the control instruction and the second data to the base station;
receiving, by the base station, the control instruction and the second data, communicating with the electronic tag device in a fast wake-up mode, and transmitting a fast wake-up instruction, the control instruction and the second data to the electronic tag device through the first communication path; and
receiving, by the electronic tag device, the fast wake-up instruction, the control instruction and the second data, and switching to a normal monitoring mode after completing the communication;
wherein the electronic tag device comprises two communication paths: the first communication path and the second communication path, the first communication path supports two monitoring modes: the normal monitoring mode and the fast monitoring mode, and the base station comprises two wake-up modes: a normal wake-up mode and the fast wake-up mode.

15. The non-transitory computer-readable storage medium according to claim 14, wherein transmitting, by the electronic tag device, the first data to the base station comprises:
attaching an ID of the electronic tag device to the first data, and transmitting the ID of the electronic tag device and the first data to the base station.

16. The non-transitory computer-readable storage medium according to claim 14, wherein receiving, by the base station, the first data and transmitting the first data to a background server comprises:
attaching, by a plurality of base stations, respective energy value information of the plurality of base stations to the first data when receiving the first data, and transmitting, by the plurality of base stations, the first data and the respective energy value information of the plurality of base stations to the background server.

17. The non-transitory computer-readable storage medium according to claim 16, wherein the computer program further executes the act of: performing, by the background server, deduplication processing on the first data uploaded by the plurality of base stations.

18. The non-transitory computer-readable storage medium according to claim 14, wherein the computer program further executes the act of: switching, by the electronic tag device, to a normal monitoring mode when the fast wake-up instruction transmitted by the base station is not received within a preset time range.

19. The non-transitory computer-readable storage medium according to claim 14, wherein the computer program further executes the act of: switching, by the electronic tag device, to the normal monitoring mode when the fast wake-up instruction is received but the control instruction and the second data are not received within a preset time range.

* * * * *